(12) United States Patent
Finnegan et al.

(10) Patent No.: US 7,189,666 B2
(45) Date of Patent: Mar. 13, 2007

(54) $CO_2$ GENERATING ABSORBENT PADS

(75) Inventors: Michael J. Finnegan, Urbandale, IA (US); Wesley L. Boldt, Des Moines, IA (US)

(73) Assignee: CO2 Technologies, Urbandale, IA (US)

( * ) Notice: Subject to any disclaimer, the term of this patent is extended or adjusted under 35 U.S.C. 154(b) by 33 days.

(21) Appl. No.: 10/862,947

(22) Filed: Jun. 8, 2004

(65) Prior Publication Data
US 2004/0247750 A1    Dec. 9, 2004

Related U.S. Application Data

(60) Provisional application No. 60/477,108, filed on Jun. 9, 2003.

(51) Int. Cl.
*B32B 9/04* (2006.01)
(52) U.S. Cl. ............... 442/153; 426/132; 426/133; 426/323; 426/324; 426/395
(58) Field of Classification Search ........ 426/132–133, 426/323–324; 442/153
See application file for complete search history.

(56) References Cited

U.S. PATENT DOCUMENTS

| | | | |
|---|---|---|---|
| 4,664,922 A | 5/1987 | Leon et al. | |
| 6,106,775 A | 8/2000 | Fuller | |
| 6,579,595 B2 * | 6/2003 | Lemaire | 428/174 |
| 2001/0031298 A1 * | 10/2001 | Fuller | 426/419 |
| 2001/0049006 A1 | 12/2001 | Lemaire | |
| 2001/0053902 A1 * | 12/2001 | Roe et al. | 604/385.01 |
| 2002/0160085 A1 * | 10/2002 | Tokita et al. | 426/124 |
| 2002/0198123 A1 | 12/2002 | Nitzsche | |
| 2004/0039362 A1 | 2/2004 | Roe et al. | |

FOREIGN PATENT DOCUMENTS

WO    WO 99/62720    * 12/1999

* cited by examiner

*Primary Examiner*—Terrel Morris
*Assistant Examiner*—Matthew Matzek

(57) ABSTRACT

A method and means for enhancing the inner environment of a package containing perishable merchandise include taking a closable package containing perishable merchandise and placing in the package a multi-layered sheet including a plurality of layers comprised of moisture absorbing materials to absorb any residual moisture emanating from the perishable merchandise. The multi-layered sheet includes a quantity of $CO_2$ generating material incorporated therein. The $CO_2$ generating material is exposable to humidity and any residual moisture within the package and any moisture absorbing material to allow the $CO_2$ generating material to emit an atmosphere of $CO_2$ within the package from exposure to moisture within the air in the package, and to absorb any residual moisture in the package.

5 Claims, 2 Drawing Sheets

CO₂ GENERATING ABSORBENT PADS

CROSS-REFERENCE TO RELATED APPLICATION

This application claims the benefit of U.S. Provisional Application No. 60/477,108, filed on Jun. 9, 2003.

BACKGROUND OF THE INVENTION

Preservation of perishable package goods by the presence of $CO_2$ within the package is a recognized beneficial phenomenon. Issues with cost, consumer acceptance, and fluid absorbency as well as the design criteria to keep the raw materials from direct contact with the perishable products had diminished their commercial acceptance. Placing some sort of a $CO_2$ generating means within the package has also been recognized, but is a less than perfected art. As indicated, fluid within the package from the perishable product can be a complicating factor.

It is therefore a principal object of this invention to provide a $CO_2$ generating means for inclusion in a package of perishable goods that is inexpensively produced, effective as a $CO_2$ generator, and which will also deal with the matter of residual liquid in the package from the perishable goods.

These and other objects will be apparent to those skilled in the art.

SUMMARY OF THE INVENTION

A method and means for enhancing the inner environment of a package containing perishable merchandise include taking a closable package containing perishable merchandise and placing in the package a multi-layered sheet including a plurality of layers comprised of moisture absorbing materials to absorb any residual moisture emanating from the perishable merchandise. The multi-layered sheet includes a quantity of $CO_2$ generating material incorporated therein. The $CO_2$ generating material is exposable to humidity and any residual moisture within the package and any moisture absorbing material to allow the $CO_2$ generating material to emit an atmosphere of $CO_2$ within the package from exposure to moisture within the air in the package, and to absorb any residual moisture in the package.

DESCRIPTION OF THE PREFERRED EMBODIMENT

Figure 1:
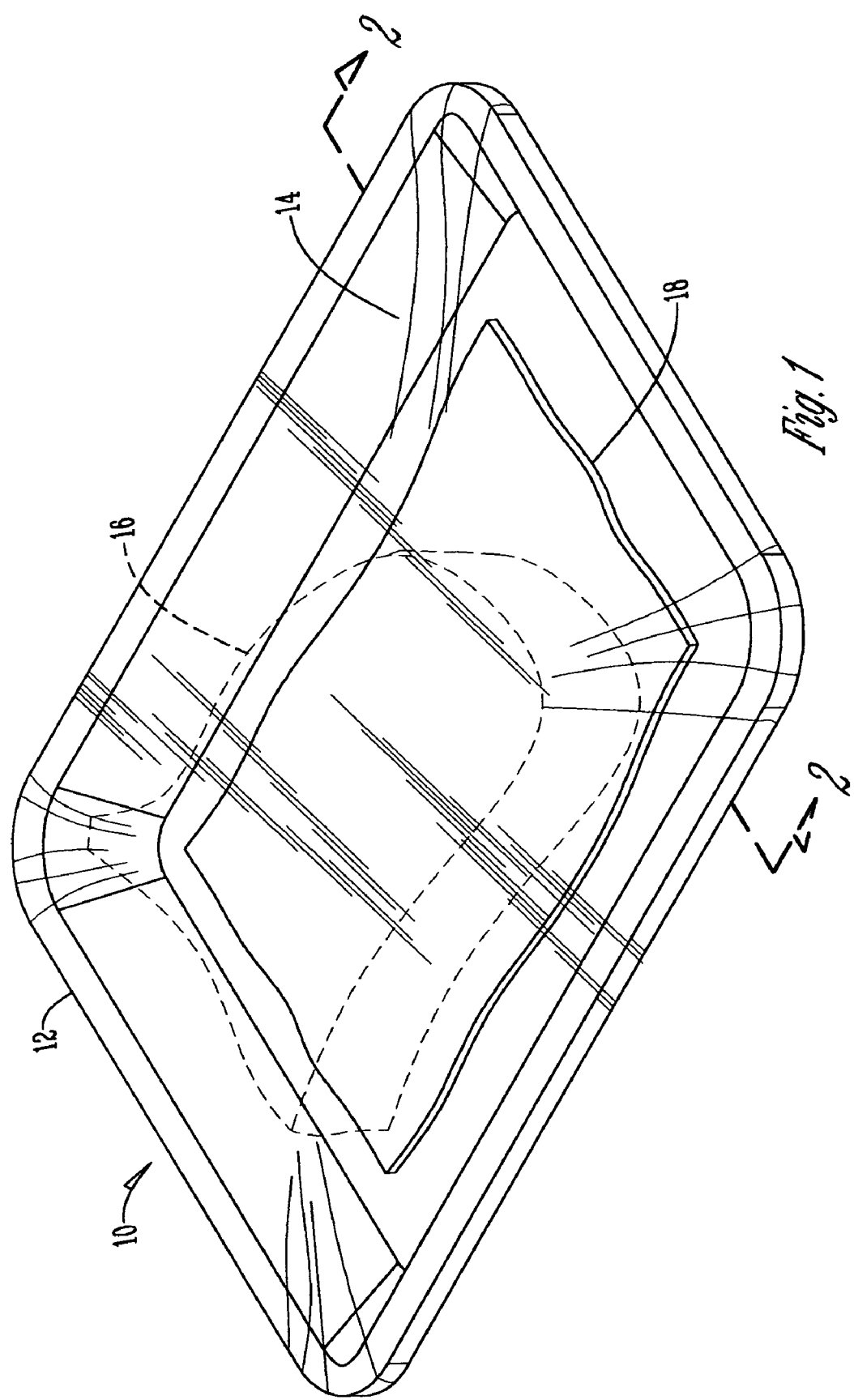
FIG. 1 is a perspective view of a package containing perishable merchandise and an absorbent pad according to the present invention.

This invention describes a method of enhancing the inner environment of a package containing perishable merchandise comprising:

1. A closable package containing perishable merchandise;
2. a multi-layered sheet including a plurality of layers comprised of moisture absorbing materials (examples of which would be airlaid pads or non-woven pads) designed to absorb excess moisture emanating from the perishable merchandise; and
3. a quantity of $CO_2$ generating material placed within the multilayer sheet such that it is exposed to the ambient humidity contained or absorbed into the sheet but not in direct contact with the perishable merchandise which allows the $CO_2$ generating material to modify the atmosphere within the package.

This invention offers a cost effective, absorbent product to the market and to consumers that have already accepted the concept of an absorbent pad in some perishable applications.

As used herein the term "perishable merchandise" includes but is not limited to such merchandise as agricultural/horticultural products, meat, fish, vegetable, fruit, flower, ornamental plant, or the like.

Non-Woven Absorbent Pads:

The composition of matter, method of manufacture, and performance characteristics of airlaid and non-woven absorbent pads comprised of either cellulosic or polymeric fibers for use as moisture absorbing materials are all well documented in the literature. As used herein the term "non-woven" or "web," as examples of moisture absorbing materials, means a web having a structure of individual fibers or threads which are interlaid, but not in an identifiable manner as in a knitted fabric. Non-woven fabrics or webs have been formed from many processes, for example: meltblowing processes, spunbonding processes, and bonded carded web processes. Other forms of moisture absorbing materials include recycled paper soaker pads(crepe paper, for example), or the like.

The basis weight of non-woven fabrics is usually expressed in ounces of material per square yard (osy) or grams per square meter (gsm) and the fiber diameters useful are usually expressed in microns. (Note that to convert from osy to gsm, multiply osy by 33.91). "Airlaying" is a well-known process by which a fibrous non-woven layer can be formed. In the airlaying process, bundles of small fibers having typical lengths ranging from about 3 to about 19 millimeters (mm) are separated and entrained in an air supply and then deposited onto a forming screen, usually with the assistance of a vacuum supply. The randomly deposited fibers are then bonded to one another using, for example, hot air or a spray adhesive. Airlaying is taught in, for example, U.S. Pat. No. 4,640,810 to Laursen et al.

For example, the strata of the absorbent pad of the present invention may be formed as an airlaid web, as described in greater detail below. As is well known in the art, cellulose fibers are typically utilized in the form of fibrous webs, which are manufactured by conventional wet-laid techniques. The fibrous webs are then used in air-laid systems to form absorbent structures used as a component of absorbent products. The absorbent structures may vary considerably in weight, density, and composition, depending upon the properties required for a particular type of absorbent product. For example, additive materials may be added to the structure, and various synthetic or modified cellulose fibers may be combined with the cellulose fibers in order to achieve a desired characteristic.

An airlaid web is typically prepared by disintegrating or fiberizing a cellulose pulp sheet or sheets, typically by hammermill, to provide individualized fibers. The individualized fibers are then air conveyed to forming heads on an airlaid web forming machine. Examples of several airlaid web forming machines are described in detail in U.S. Pat. No. 5,527,171. The forming heads may include rotating or agitated drums which serve to maintain fiber separation until the fibers are pulled by a vacuum onto a foraminous condensing drum or foraminous forming conveyor (or forming wire). Other fibers, such as a synthetic thermoplastic fiber, may also be introduced to the forming head through a fiber dosing system which includes a fiber opener, a dosing unit and an air conveyor. Where two defined strata are desired, such as a fluff pulp distribution stratum and a synthetic fiber acquisition stratum, two separate forming heads may be used for each type of fiber.

After the fibers are airlaid the resulting structure is densified and the fibers are bonded together. Typically a calendar is used to densify the resulting structure. Compaction may also occur before all of the strata have been airlaid. In an air-laid process, after the fibers are condensed into a web, the fibrous web often lacks any significant structural integrity. Often, sheets of tissue are used on the top and bottom of the web to provide additional support to the web. Other means of stabilizing an air-laid web include thermal bonding by including specially treated synthetic fibers which melt upon heating and solidify upon cooling to bond with the cellulose fibers and promote retention of a desired shape. The use of latex binders within and on the surface of fibrous webs also have been proposed as a means to provide structural integrity to fibrous webs.

Fibers:

Suitable fibers for use in the present invention include cellulosic or synthetic fibers, and non-woven absorbent pads formed therefrom. Other natural fibers for use in the present invention include chopped silk fibers, wood pulp fibers, bagasse, hemp, jute, rice, wheat, bamboo, corn, sisal, cotton, flax, kenaf, peat moss, and mixtures thereof.

Cellulosic fibers may be wood pulp fibers or softwood pulp fibers, and also may be chemical or thermomechanical or chemithermomechanical or combinations thereof. Wood pulp fibers can be obtained from well known chemical processes such as the kraft and sulfite processes. Wood pulp fibers can also be obtained from mechanical processes, such as ground wood, mechanical, thermomechanical, chemimechanical, and chemithermomechanical pulp processes. Ground wood fibers, recycled or secondary wood-pulp fibers, and bleached and unbleached wood-pulp fibers can be used. Details of the production of wood pulp fibers are well known to those skilled in the art. These fibers are commercially available from a number of companies.

The fibers may also be pretreated prior to the formation of the non-woven absorbent pad. This pretreatment may include physical treatment, such as subjecting the fibers to steam or chemical treatment, such as cross-linking the fibers. Although not to be construed as a limitation, examples of pretreating fibers include the application of surfactants or other liquids to the fibers, such as water or solvents, which modify the surface of the fibers.

The fibers also may be pretreated in a way which increases their wettability. The fibers also may be pretreated with conventional cross-linking materials and may be twisted or crimped, as desired. Pretreating cellulose fibers with chemicals which result in lignin or cellulose rich fiber surfaces also may be performed in a conventional manner.

Bleaching processes, such as chlorine or ozone/oxygen bleaching may also be used in pretreating the fibers. In addition, the fibers may be pretreated, as by slurrying the fibers in baths containing various solutions. Fibers pretreated with other chemicals, such as thermoplastic and thermoset resins also may be used. Combinations of pretreatments also may be employed.

Binders:

Many binders and methods are known for incorporating additive materials to non-woven absorbent pads. One, or more than one, of these methods are used in the present invention to bind an additive material of $CO_2$ generating material to a fibrous substrate of the absorbent pad.

One problem with the use of additive materials is that the additive material can be physically dislodged from the fibers of a non-woven absorbent pad. Separation of the additive material from its substrate diminishes the effectiveness of the additive material. This problem was addressed in European Patent Application 442 185 A1, which discloses use of a polyaluminum chloride binder to bind an additive material to a fibrous substrate.

A method of immobilizing additive materials is disclosed in U.S. Pat. No. 4,410,571 in which a water swellable absorbent polymer additive material is converted to a non-particulate immobilized confluent layer. Polymer particles are converted to a coated film by plasticizing them in a polyhydroxy organic compound such as glycerol, ethylene glycol, or propylene glycol. The superabsorbent assumes a non-particulate immobilized form that can be foamed onto a substrate. The individual particulate identity of the superabsorbent polymer is lost in this process.

U.S. Pat. No. 4,412,036 and U.S. Pat. No. 4,467,012 disclose absorbent laminates in which a hydrolyzed starch polyacrylonitrile graft copolymer and glycerol mixture is laminated between two tissue layers. The tissue layers are laminated to each other by applying external heat and pressure. The reaction conditions form covalent bonds between the tissue layers that firmly adhere the tissue layers to one another. Numerous other patents have described methods of applying binders to fibrous webs. Examples include U.S. Pat. No. 2,757,150; U.S. Pat. No. 4,584,357; and U.S. Pat. No. 4,600,462.

Yet other patents disclose crosslinking agents such as polycarboxylic acids that form covalent intrafiber bonds with individualized cellulose fibers, as in European Patent Application 440 472 A1; European Patent Application 427 317 A2; European Patent Application 427 316 A2; and European Patent Application 429 112 A2. The covalent intrafiber bonds are formed at elevated temperatures and increase the bulk of cellulose fibers treated with the crosslinker by forming intrafiber ester crosslinks. Crosslinking must occur under acidic conditions to prevent reversion of the ester bonds. The covalent bonds within the fibers produce a pulp sheet that is more difficult to compress to conventional pulp sheet densities than in an untreated sheet. Covalent crosslink bonds may also form between the fibers and particles of additive material.

Still other patents disclose binders that have a functional group that forms a hydrogen bond with the fibers, and a functional group that is also capable of forming a hydrogen bond or a coordinate covalent bond with particles that have a hydrogen bonding or coordinate covalent bonding functionality, as in U.S. Pat. No. 6,461,553. The fibers of the non-woven absorbent pad are provided with hydrogen bonding functional sites, and the binder has a volatility less than water. The binder is applied to the particles to at least partially coat the particles of additive material. The binder containing particles of additive material, when combined with the fibers, are bonded to the fibers by a bond that has been found to be resistant to mechanical disruption.

Yet other patents disclose thermoplastic binders, as in U.S. Pat. No. 6,420,626 (See Also U.S. Ser. No. 09/892, 408). The fibers of the upper and lower strata may be bonded together by heat softening a thermoplastic binder present with the web fibers. The thermoplastic binder includes any thermoplastic polymer, which can be melted at temperatures that will not extensively damage the cellulosic fibers. It is generally desirable for the melting point of the thermoplastic binding material to be less than about 175 degrees Celsius. Examples of suitable thermoplastic materials include thermoplastic microfibers, thermoplastic powders, bonding fibers in staple form, and bicomponent staple fibers. In particular, the thermoplastic binding material may, for example, be polyethylene, polypropylene, polyvinylchloride, and/or polyvinylidene chloride. Other synthetic fibrous materials which can be utilized in thermally bonded webs are described above. The thermoplastic binders may be intermixed with the cellulosic fibers in the airlaid web forming machine or may be added to the appropriate strata subsequent to their being airlaid.

Alternatively or in addition, the upper and lower fiber strata may be bonded together by applying a latex spray, as shown in U.S. Pat. No. 6,420,626. Examples of elastomeric polymers available in latex form include butadiene-styrene, butadiene-acrylonitrile, and chloroprene (neoprene). Other examples of synthetic polymers that can be used in latexes include polymers or copolymers of alkylacrylates, vinyl acetates such as ethylene vinyl acetate, and acrylics such as styrene-butadiene acrylic. For purposes of industrial hygiene and elimination of a solvent recycling step, the synthetic latexes can be applied as an aqueous based emulsion rather than an organic solvent emulsion. Latexes useful in the present invention may be prepared by emulsion polymerization of certain olefinic (ethylenically unsaturated) monomers. This emulsion polymerization can be carried out by customary methods using any of a variety anionic, nonionic, cationic, zwitterionic and/or amphoteric emulsifiers to stabilize the resultant latex, including alkyl sulfates, alkylaryalkoxy sulfates, alkylarylsulfonates and alkali metal and/or ammonium salts of alkyl- and alkylaryl-polyglycol ethersulfates; oxyethylated fatty alcohols or oxyethylated alkylphenols, as well as block copolymers of ethylene oxide and propylene oxide; cationic adducts of primary, secondary or tertiary fatty amines or fatty amine oxyethylates with organic or inorganic acids, and quaternary alkylammonium surfactants; and alkylamidopropylbetaines. The olefinic monomer can be a single type of monomer or can be a mixture of different olefinic monomers, i.e., to form copolymer particles dispersed or emulsified in the aqueous phase. Examples of olefinic monomers that can be used to form latex polymers include $C_2$–$C_4$ alkyl and hydroxy alkyl acrylates, such as those selected from the group of propyl acrylate, n-butyl acrylate, isobutyl acrylate, 2-hydroxyethyl acrylate, 2-hydroxypropyl acrylate, ethyl acrylate and mixtures thereof. Other examples are $C_1$–$C_4$ alkyl or hydroxy alkyl methacrylates selected from the group of propyl methacrylate, n-butyl methacrylate, isobutyl methacrylate, 2-hydroxyethyl methacrylate, 2-hydroxypropyl methacrylate, ethyl methacrylate, methyl methacrylate, vinyl acetate and mixtures thereof. Also suitable are mixtures of the aforementioned $C_2$–$C_4$ alkyl and hydroxy alkyl acrylates and $C_1$–$C_4$ alkyl or hydroxy alkyl methacrylates. Methods of applying the latex include coating, dipping, brushing, spraying, and foaming. In a preferred embodiment, the latex is applied by spraying. The latex resin can be applied before or after compaction of the fiber web.

A typical absorbent structure formed with thermoplastic binder and/or latex has an upper stratum including fibers and thermal or latex binder resin; and will typically have a basis weight of 20–120 gsm (grams per square meter). The lower stratum may include fluff cellulose and/or chemically modified cellulose fiber and thermal and/or latex binder resin; and will typically have a basis weight of 20–200 gsm.

$CO_2$ Generating Material:

Many different types of additive materials may be added to fibers for different end uses. For example superabsorbent particles, antimicrobials, zeolites and fire retardants are but a few examples of additive materials that are added to fibers. In the present invention, $CO_2$ generating material is supplied as the additive material being incorporated in non-woven absorbent pads.

The basic technology for combining a carboxylic acid with a hydrogen carbonate base in the presence of moisture to generate carbon dioxide gas is covered by several existing and expired patents. The $CO_2$ generating material contained within the absorbent pad contains a mixture of a carboxylic acid and a hydrogen carbonate base. The carboxylic acid can be any acid or combination of acids that, when reacted with a base or combination of bases, results in the production of carbon dioxide. The carboxylic acid can be aliphatic or aromatic.

Aliphatic acids include, but are not limited to, Formic acid, Acetic acid, Propionic acid, Butyric acid, Valeric acid, Caproic acid, Enanthic acid, Caprylic acid, Pelargonic acid, Capric acid, Propiolic acid, Vinylformic acid, Glyoxylic acid, Glycollic acid, 3-Butynoic acid, Crotonic acid, Vinylacetic acid, Pyruvic acid, Isobutyric acid, Oxalic acid, Lactic acid, trans-2-Penten-4-ynoic acid, Propargylacetic acid, Pent-2-enoic acid, Allylacetic acid, Isovaleric acid, Valeric acid, Malonic acid, alpha-Hydroxybutyric acid, 2-Methyllactic acid, 2-Furoic acid, Sorbic acid, trans, cis-2,4-Hexadienoic Acid, D,L-Propargylglycine, Acetylenedicarboxylic acid, Hydrosorbic acid, beta-Propylacrylic acid, Strawberiff (IFF), Maleic acid, Fumaric acid, Levulinic acid, Caproic acid, 3-Methyl valeric acid, Succinic acid, 2-Heptenoic acid, cis-Hept-3-enoic acid, Methylenesuccinic acid, Oenanthic acid, Oxalacetic acid, Glutaric acid, Peroxyhexanoic acid, Malic acid, alpha-Toluic acid, Furylacrylic acid, trans,trans-Muconic acid, trans-Oct-2-enoic acid, cis-Oct-3-enoic acid, 4-Ethyl-hex-2-enoic acid, trans-3-Hexenedioic acid, Caprylic acid, 2-Ethylcaproic acid, alpha-Ketoglutaric acid, Phenylpropiolic acid, Adipic acid, D-Tartaric acid, Hydrocinnamic acid, p-Hydroxyphenylacetic acid, o-Hydroxyphenylacetic acid, (S)-Mandelic acid, (R)-Mandelic acid, cis-Non-3-enoic acid, alpha-Nonenoic acid, Pelargonic acid, Pimelic acid, 4-Phenyl-but-3-ynoic acid, Peroxyoctanoic acid, 4,6-Decadiynoic acid, p-Hydroxybenzoylformic acid, 4,6-Decadiyne-1,10-dioic acid, (R)-p-Hydroxymandelic acid, p-Hydroxymandelic acid, racemate, (S)-p-Hydroxymandelic acid, 4-Decynoic acid, 4-Ethyl-2-octenoic acid, Dec-3-enoic acid, 6-Acetoxy-5-hexenoic acid, 6-Acetoxy-4-hexenoic acid, 4-Ethylcaprylic acid, Capric acid, Aconitic acid, Suberic acid, 5-Phenyl-pent-4-ynoic acid, Vitamin C, alpha-Mercapto-caprylate, Diperoxyadipic acid, 4-Oxo-4-phenyl-butyric acid, 5-Phenyl valeric acid, Hendecynoic acid, 5-Cyclohexyl-2-pentenoic acid, Cyclohexyl n-valerate, Undecylenic acid, 2-Hendenoic acid, 1-Naphthylacetic acid, trans-10-Hydroxy-dec-8-enoic Acid, Undecanoic acid, Azelaic acid, Peroxydecanoic acid, Benzo[1,3]dioxol-5-yl-propynoic Acid, Hexanoic acid, carboxyhydroxy-methyl ester, Citric acid, Quinic acid, D-Gluconic acid, 10-Dodecynoic Acid, 9-Dodecynoic acid, 3-Dodecynoic Acid, 7-Dodecynoic acid, 8-Dodecynoic acid, 9-Dodecenoic acid, Dodec-2-enoic acid, 6-Dodecenoic acid, 7-Dodecenoic acid, 3-Methyl-undec-5-enoic acid, cis-5-Dodecenoic acid, 10-Dodecenoic Acid, 8-Dodecenoic acid, 3,8-Dimethyl-dec-5-enoic acid, Dodec-11-enoic acid, AI3-05999, 9-Methyl-undecanoic acid, Lauric acid, 3-Methyl-undecanoic acid 4-Oxo-6-phenyl-hex-5-ynoic acid, beta-Naphthoxyacetic acid, Sebacic acid, alpha-Mercaptocaprate, 4-Oxo-6-phenyl-hexanoic acid, Galactaric acid, trans,trans-2,12-Tridecadienoic acid, 3,5-Dimethyl-undec-5-enoic acid, 12-Tridecenoic acid, trans-Tridec-2-enoic acid, 11-Methyl-dodecanoic acid, 10-Methyldodecanoic acid, Tridecylic acid, 12-Amino-dodecanoic acid, 2-(3-phenyl-prop-2-ynylidene)-malonic acid, Tetradeca-7,11-diene-5,9-diynoic Acid, alpha-Hydroxy-laurate, 8-Cyclohexyl-octanoic acid, 3-Ethyl-dodec-5-enoic acid, Tetradec-2-enoic acid, Myristoleic acid, cis,cis-5,8-Dihydroxy-2,6-dodecadienoic acid, 11-Methyl-tridecanoic acid, Myristic acid, Aseanostatin P1, Decamethylenedicarboxylic acid, alpha-Mercapto-laurate, Diperoxysebacic acid, cis-10-Pentadecenoic acid, 2-(2-Cyclopentyl-ethyl)-octanoic acid, 13-Methylmyristate, Sarcinic acid, Pentadecyclic acid, 1,13-Tridecanedioic acid, alpha-Hydroxymyristic acid, Decanoic acid, carboxy-hydroxy-methyl ester, 2-(3-Cyclopentenyl)-undecanoic acid, cis,cis-14-Methyl-5,9-pentadecadienoic acid, Palmitelaidic acid, 2-(2-Propenyl)-tridecanoic acid, 2-(2-Cyclopentyl-ethyl)-nonanoic acid, Palmitoleic acid, 2-(4-Cyclohexyl-butyl)-hexanoicacid, 2-(2-Cyclohexyl-ethyl)-octanoic acid, 2-Cyclopropylmethyl-dodecanoic acid, 2-Cyclohexylmethyl-nonanoic acid, trans-2-hexadecenoic acid, 2-Heptyl-2-nonenoic acid, 2-Butyl-dodecanoic acid, Palmitic acid, 14-Methylpentadecanoic acid, Anteisopalmitic acid, 2-Heptyl-nonanoic acid, 2-Hexyldecanoic acid 1,12-Dodecanedicarboxylic acid, alpha-Mercapto-myristate, 2-(3-Cyclopentenyl)-dodecanoic acid, 2-(2-Propenyl)-tetradecanoic acid, 2-(4-Cyclohexyl-butyl)-heptanoic acid, 2-Cyclobutylmethyl-dodecanoic acid, 2-(2-Cyclopentyl-ethyl)-decanoic acid, 2-(3-Cyclohexyl-propyl)-octanoic acid, 2-(2-Cyclohexyl-ethyl)-nonanoic acid, cis-10-Heptadecenoic acid, 2-(Methylcyclohexyl)-decanoic acid, 2-Butyl-12-tridecenoic acid, 2-(Methylcyclopropyl)-tridecanoic acid, 2-Cyclohexyl-undecanoic acid, cis,cis-8-Acetoxy-5-hydroxy-2,6-dodecadienoic acid, 15-Methyl-hexadecanoic acid, 2-Heptyl-decanoic acid, 14-Methylpalmitic acid, Margaric acid, 2-Hydroxypalmitic acid, gamma-Linolenic acid, Linolenic acid, alpha-Elaeostearic acid, beta-Elaeostearic acid, cis,cis-6,12-Octadecadienoic acid, 8-Octadecynoic acid, Isolinoleic acid, 10-Octadecynoic acid, 12-Octadecynoic acid, 14-Octadecynoic acid, 6-Octadecynoic acid, 4-Octadecynoic acid, cis,cis-7,12-Octadecadienoic acid, 2-Octadecynoic acid, 7-Octadecynoic acid, cis,cis-5,12-Octadecadienoic acid, cis,cis-8,12-Octadecadienoic acid, 5-Octadecynoic acid, 17-Octadecynoic acid, Chaulmoogric acid, 13-Octadecynoic Acid, 15-Octadecynoic acid, 11-Octadecynoic acid, Linolelaidic acid, Linoleic acid, trans,trans-10,12-Octadecdienoic acid, Cilienic acid, cis,cis-6,10-Octadecadienoic acid, 9-Stearolic acid, 2-(2-Cyclohexyl-ethyl)-4-cyclohexyl-butanoic acid, Oleic acid, trans-10-Octadecenoic Acid, Dihydrochaulmoogric acid, 14-Octadecenoic acid, 15-Octadecenoic acid, 17-Octadecenoic acid, 2-(2-Cyclohexyl-ethyl)-decanoic acid, cis-5-Octadecenoic acid, 2-(4-Cyclohexyl-butyl)-octanoic acid, 2-Octyl-2-decenoic acid, 2-Cyclohexyl-dodecanoic acid, 2-(2-Propenyl)-pentadecanoic acid, cis-12-Octadecenoic acid, cis-Vaccenic acid, Octadec-2-enoic acid, trans-Vaccenic acid, Petroselinic acid, 4-Octadecenoic acid, Petroseladic acid, trans-12-Octadecenoic acid, Isooleic acid, 2-(3-Cyclohexyl-propyl)-nonanoic acid, cis-7-Octadecenoic acid, cis-8-Octadecenoic acid, 2-Cyclopentyl-tridecanoic acid, cis-13-Octadecenoic acid, Elaidic acid, cis-2-Methoxy-5-hexadecenoic acid, 11-Cyclohexyl-9-hydroxy-undecanoic acid, cis-2-Methoxy-6-hexanoic acid, 2-Ethylhexadecanoic acid, Stearic acid, Isostearic acid, 15-Methyl-heptadecanoic acid, Tridecanoic acid, carboxy-hydroxy-methyl ester, alpha-Mercapto-palmitate, 9,10-Epoxylinolenic acid, 9-Hydroxylinolenic acid, 13-Hydroxylinolenic acid, 16-Hydroxylinolenic acid, 270. 15-Epoxylinolenic acid, 2-(2-Cyclopent-2-enyl-ethyl)-dodecanoic acid, 5-Cyclohexyl-2-(2-cyclohexyl-ethyl)-pentanoic acid, Ricinstearolic acid, 12-Epoxylinoleic acid, 13-Hydroxylinoleic acid, Lactisaric acid, 9-Hydroxylinoleic acid, 9-Epoxylinoleic acid, cis-7-Nonadecenoic acid, trans-7-Nonadecenoic Acid, 2-Cyclohexyl-tridecanoic acid, Ricinoleic acid, Ricinelaidic acid, Oxidooleic acid, trans-8-(3-Octyl-oxiranyl)-octanoic Acid, Nonadecylic acid, 17-Methyloctadecanoic acid, 16-Methyl-octadecanoic acid, 12-Hydroxy-stearic acid, alpha-Hydroxystearic acid, Arachidonic acid, Pulvic acid, Arachidic acid, 3RS,7R,11R-Phytanic acid, 18-Methyl-nonadecanoic acid, 9,10-Dihydroxy-stearic acid, alpha-Mercapto-stearate, 9-Oxo-13-prostenoic acid, Cibaric acid, Protolichesterinic acid, 9-Oxoprostanoic acid, Cervonic acid, Hexadecanoic acid, carboxy-hydroxy-methyl ester, trans-9,12,13-Trihydroxy-10-octadecenoic Acid, Clupanodonic acid, 9,10,12-Trihydroxy-stearic acid, Erucic acid, Brassidic acid, Acetyl aleuritolic acid, Sativic acid, alpha-Disulfodicaprylate, Nervonic acid, Rangiformic acid, cis-6,7,8-Triacetoxy-5-hydroxy-2-decenoic acid, alpha-Disulfodicaprate, Laricic acid, alpha-Disulfodilaurate, 2-Amino-succinic acid, 1-(4-octadecanoyloxy-butyl)ester, alpha-Disulfodimyristate, alpha-Disulfodipalmitate, and alpha-Disulfodistearate.

Aromatic acids include, but are not limited to, Benzoic acid, Anthranilic acid, m-Salicylic acid, Salicylic acid, p-Salicylic acid, Anisic acid, m-Anisic acid, 6-Methylsalicylic acid, o-Anisic acid, 4-Amino-salicylic acid, Protocatechuic acid, gamma-Resorcylic acid, alpha-Resorcylic acid, beta-Resorcylic acid, o-Pyrocatechuic acid, Gentisic acid, Piperonylic acid, Terephthalic acid, Phthalic acid, 3-Formyl-4-hydroxy-benzoic acid, 3-Ethyl-2-hydroxy-benzoic acid, Isovanillic acid, o-Vanillic acid, p-Osellinic acid, 4-Methoxy-salicylic acid, Orsellic acid, Vanillic acid, 5-Methoxy-salicylic acid, Pyrogallolcarboxylic acid, Phloroglucinic acid, Gallic acid, Acetylsalicylic acid, 6-Hydroxy-benzo[1,3]dioxole-5-carboxylic acid, Monoperphthalic acid, 3,5-Dimethoxy-benzoic acid, 2,5-Dimethoxybenzoic acid, Veratric acid, 2,6-Dimethoxybenzoic acid, beta-Orcincarboxylic acid, o-Veratric acid, 3,5-Dihydroxy-p-anisic acid, alpha-Hydroxynaphthalic acid, beta-Hydroxynaphthalic acid, Divaric acid, Syringic acid, 3,4-Dimethoxy-5-hydroxybenzoic acid, 4,6-Dimethoxysalicylic acid, Oxy-beta-Ocrincarboxylic acid, 4-(5-Hydroxy-pentyl)-benzoic acid, 6-Pentyl-salicylic acid, 2-Acetylaminogentisic acid, 2,4,5-Trimethoxybenzoic acid, Eudesmic acid, 2,4,6-Trimethoxybenzoic acid, o-Phenoxy-benzoic acid, m-Phenoxybenzoic acid, Taboganic acid, Olivetolic acid, 4-(5-Hydroxy-pentyloxy)-benzoic acid, 3-Hydroxy-5-phenoxy-benzoic acid, 2-(2-Hydroxy-phenoxy)-benzoic acid, 3-(3-Hydroxy-phenoxy)-benzoic acid, 4'-Hydroxy-3-phenoxybenzoic acid, 5-Hexyl-2,4-dihydroxy-benzoic acid, p,p'-Diphenic acid, 3-(4-Methoxy-phenoxy)-benzoic acid, 2-(3-Phenyl-propynoyl)-benzoic acid, 6-Octyl-salicylic acid, 2-(4-Carboxy-phenoxy)-benzoicacid, Olivetonic acid, 4-(5-Carboxy-3-hydroxy-phenoxy)-benzoic Acid, 6-Decyl-salicylic acid, 3,7-Dihydroxy-dibenzofuran-1,9-dicarboxylic acid, 6-Dodecyl-salicylic acid, Lecanoric acid, Anacardic acid, 6-[8(Z),11(Z)-Pentadecadienyl]salicylic acid, 6-[8(Z)-Pentadecenyl] salicylic acid, 6-Pentadecyl-salicylic acid, Parellic acid, 2,4-Dihydroxy-6-pentadec-8-enyl-benzoic acid, cis,cis-2-Heptadeca-3,6,9-trienyl-6-hydroxy-benzoic acid, cis,cis-2-Heptadeca-6,9-dienyl-6-hydroxy-benzoic acid, Protocetraric acid, cis-2-Heptadec-10-enyl-6-hydroxy-benzoic acid, Divaricatic acid, cis-2-Hydroxy-6- nonadec-12-enyl-benzoic acid, Sphaerophorin, 6-Eicosyl-salicylic acid, 2-(10-Acetoxy-pentadec-8-enyl)-4,6-dihydroxy-benzoic acid, Anziaic acid, cis-2-Heneicos-15-enyl-6-hydroxy-benzoic acid, alpha-Collatolic acid, and Microphyllic acid.

In a preferred embodiment, the carboxylic acid is citric acid.

The hydrogen carbonate base can be any base that, when reacted with a carboxylic acid, results in the production of carbon dioxide. Preferably, the base is a carbonate, bicarbonate, tricarbonate, etc. More preferably, the base is a metal carbonate, metal bicarbonate, metal tricarbonate, etc. Examples of such carbonates, bicarbonates, and tricarbonates, etc. include, but are not limited to, calcium carbonate, sodium carbonate, lithium carbonate, potassium carbonate, calcium bicarbonate, sodium bicarbonate, lithium bicarbonate, and potassium bicarbonate, etc.

In a most preferred embodiment, the base is sodium bicarbonate.

The total amount of the $CO_2$ generating material is not critical to the operability of the invention and will depend on the size of the absorbent pad. The carboxylic acid:base weight ratio can be from about 1:1 to about 1:100. When citric acid and sodium bicarbonate are used, the citric acid:sodium bicarbonate weight ratio can be from about 1:20 to about 1:1 and, preferably, 1:15.

The basis weight of the $CO_2$ generating material within the multi-layered sheet should be as high as the process capability of the equipment allows, for optimum economic and performance characteristics. The $CO_2$ generating material can preferably have a basis weight of from about 10 gsm to about 300 gsm. The multi-layered sheet having an acceptable total basis weight of about 50–200 gsm, a preferred total basis weight of about 350–500 gsm, and a most preferred total basis weight of about 200–350 gsm.

Additional description of the $CO_2$ generating material used according to the present invention is found in U.S. Pat. No. 6,340,654, the disclosure of which is hereby expressly incorporated herein by reference in its entirety.

The $CO_2$ generating material can preferably have from about 3 weight percent to about 60 weight percent, and more preferably from about 21 weight percent to about 40 weight percent based on the total weight of the $CO_2$ generating material containing absorbent pad.

No particular limitation is imposed on the form of the $CO_2$ generating material used according to the present invention. However, the above-described carboxylic acid and hydrogen carbonate base $CO_2$ generating material may be used by formulating the $CO_2$ generating material into a powdery or granular form together with one or more of various additives, antibacterial agents, anti-mold agents and the like as needed or by having them borne on a suitable carrier.

Method of Use:

While the present invention utilizes many known technologies, the combination of these technologies, and the specific steps taken to enhance the inner environment of a package containing perishable merchandise with these technologies, is new and inventive.

Figure 2:
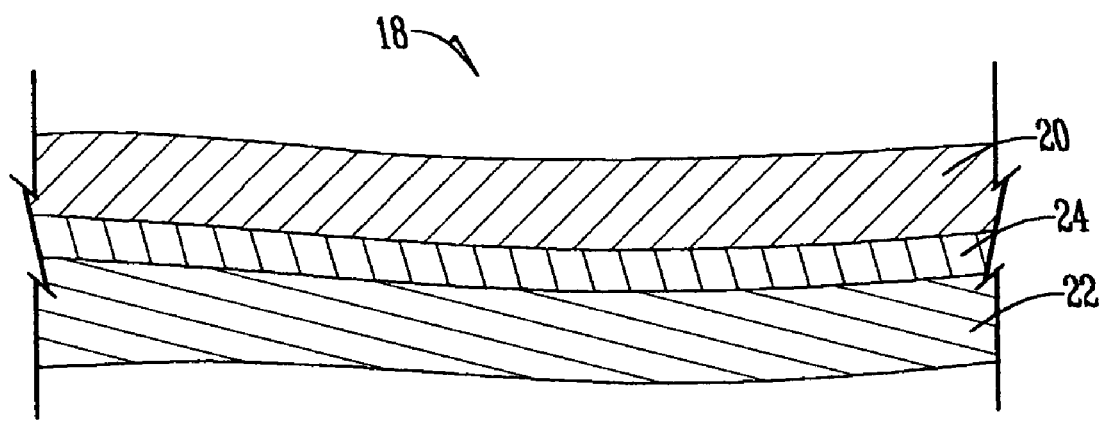
FIG. 2 is a partial cross sectional view of the absorbent pad according to the present invention taken along line 2—2 of FIG. 1.

With reference to FIG. 1, a package 10 has a main body 12 sealed by cover 14. The package 10 contains perishable merchandise 16 and an absorbent pad 18 according to the present invention FIG. 2 illustrates a partial cross sectional view of the absorbent pad 18 of the device of the invention. The first and second layers 20 and 22 are comprised of a plurality of airlaid layers of absorbent material, with a quantity of moisture actuated $CO_2$ generating material 24 located between at least two of the layers 20 and 22. As shown, vapor penetrates the first and second layers 20 and 22 to actuate the $CO_2$ generating material 24.

According to the present invention, a $CO_2$ generating material is caused to concurrently exist in a surrounding atmosphere of an perishable merchandise, whereby water vapor evaporated from the perishable merchandise or its dew is brought into contact with the mixture, and by such vapor, carbon dioxide gas occurs gradually. Accordingly, the freshness-retaining property of the $CO_2$ generating material according to the present invention is presumed to be expressed in accordance with a mechanism to be described hereinafter. Namely, an addition of vapor, which has evaporated from the perishable merchandise, to the $CO_2$ generating material according to the present invention results in gradual occurrence of carbon dioxide gas, and this carbon dioxide gas suppresses the rate of perishing of the perishable merchandise.

To retain the freshness of perishable merchandise, it is necessary to make the perishable merchandise and the $CO_2$ generating material of the present invention exist together in the same atmosphere. No particular limitation is imposed on the state of coexistence of the perishable merchandise and the $CO_2$ generating material. For example, both of them may be placed together in a plastic bag, or the perishable merchandise packed directly in corrugated fiberboard boxes and the $CO_2$ generating material also packed directly in different corrugated fiberboard boxes may be placed together in a container. Whichever state of coexistence is employed, no particular limitation is imposed on the amount of the $CO_2$ generating material of the present invention to be used.

When the $CO_2$ generating material is caused to act on perishable merchandise, a delaying of a deterioration in the freshness of the perishable merchandise can be achieved owing to the ethylene concentration lowering effects of the organic acid and carbon dioxide gas, and the antibacterial and anti-mold property of the organic acid also acts effectively so that occurrence of staining microorganisms and offensive odor can also be suppressed.

Therefore, it can be appreciated that the present invention provides a non-woven fiber based absorbent pad that is a "dry" $CO_2$ generating system activated by water vapor. Conversely, other $CO_2$ generating systems are directed to a "wet" system where the $CO_2$ generating materials are wetted at least with liquid water to begin use. Such "wet" systems are inferior due to the generated $CO_2$ being lost in the fluid itself instead of being available as $CO_2$ gas. Additionally, "wet" systems are not operable below zero degrees Celsius where the device becomes inoperable due to water freezing. Conversely, the present "dry" system reduces the $CO_2$ being lost fluid and is also operable below zero degrees Celsius.

The present invention will hereinafter be described in further detail based on Examples.

EXAMPLES

The following are examples of tests on two embodiments of the invention:

Example #1

This test involved an airlaid web with a basis weight of 150 grams per square meter (basis weight determines thickness and therefore absorbency) that contained 22.5 grams per square meter of a mixture of (12% by weight Citric Acid and 88% by weight sodium bicarbonate). Citric acid was chosen for its food contact and regulatory approvals vs. acetyl salicylic acid that requires operators and materials handlers to wear respirators to comply with OSHA guidelines for airborne particulate irritants. Sodium bicarbonate was chosen for its reactivity in the presence of moisture. Both ingredients had previously survived processing checks and demonstrated efficacy.

Example #2

This test involved an airlaid web with a basis weight of 150 grams per square meter that contained 40 grams of a mixture of (20% by weight Citric Acid and 80% by weight sodium bicarbonate).

This type of "Active Pad" has applications anywhere there is a need for atmospheric modification with $CO_2$ to extend the useful life of perishable products. Applications include Floral, Bakery, Deli, Meat, Seafood, Produce, and Consumer uses. Existing "soaker pads" found in meat tray packs in grocery stores could serve both their existing use and, as a result of this invention, serve to modify the atmosphere in the package extending shelf life of the product. For example, pallet shipments of strawberries from the west coast are currently sealed in a bag and gassed with $CO_2$. Replacing that process with an appropriate sized Pad would yield significant cost savings to the shipper in capital equipment, labor, and materials costs.

It is therefore seen that this invention will achieve its stated objectives.

We claim:

1. An absorbent pad comprised of a plurality of layers of absorbent material, with a quantity of moisture actuated $CO_2$ generating material located between at least two of the layers wherein the absorbent material has a basic weight of 150 grams per square meter that contains 40 grams per square meter of a mixture by weight of 20% acid and 80% sodium bicarbonate;
   wherein the moisture actuated $CO_2$ generating material is operable below 0° C.;
   wherein the absorbent material is a non-woven fabric;
   wherein the absorbent material is airlaid web; and
   wherein the quantity of moisture actuated $CO_2$ generating material is bound to fibers of the absorbent material.

2. The absorbent pad of claim 1 wherein the absorbent material has a basic weight of 150 grams per square meter that contains 22.5 grams per square meter of a mixture by weight of 12% acid and 88% of sodium bicarbonate.

3. The absorbent pad of claim 2 wherein the acid is citric acid.

4. An absorbent pad comprised of a plurality of layers of absorbent material, with a quantity of moisture actuated $CO_2$ generating material located between at least two of the layers wherein the moisture actuated $CO_2$ generating material is operable below 0° C.;
   wherein the absorbent material is a non-woven fabric;
   wherein the absorbent material is airlaid web; and
   wherein the quantity of moisture actuated $CO_2$ generating material is bound to fibers of the absorbent material.

5. The absorbent pad of claim 4 wherein the absorbent material has a basic weight of between 150 grams and 250 grams per square meter that contains 40 to 150 grams per square meter of a mixture by weight of 20% to 40% acid and 60% to 80% of base.

* * * * *